US012656104B2

(12) United States Patent
Lee et al.

(10) Patent No.: US 12,656,104 B2
(45) Date of Patent: Jun. 16, 2026

(54) COATING THICKNESS MEASURING APPARATUS AND METHOD

(71) Applicant: LG Chem, Ltd., Seoul (KR)

(72) Inventors: Do-Hyun Lee, Daejeon (KR);
Seung-Heon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 60 days.

(21) Appl. No.: 18/701,049

(22) PCT Filed: Apr. 25, 2023

(86) PCT No.: PCT/KR2023/005629
§ 371 (c)(1),
(2) Date: Apr. 12, 2024

(87) PCT Pub. No.: WO2023/211123
PCT Pub. Date: Nov. 2, 2023

(65) Prior Publication Data
US 2024/0344822 A1      Oct. 17, 2024

(30) Foreign Application Priority Data

| Apr. 29, 2022 | (KR) | ......................... | 10-2022-0053732 |
| Apr. 29, 2022 | (KR) | ......................... | 10-2022-0053733 |
| Apr. 19, 2023 | (KR) | ......................... | 10-2023-0051593 |

(51) Int. Cl.
*G01B 11/06*          (2006.01)
*G01B 21/04*          (2006.01)

(52) U.S. Cl.
CPC ........ *G01B 11/0625* (2013.01); *G01B 21/045* (2013.01)

(58) Field of Classification Search
CPC ......................... G01B 11/0625; G01B 21/045
See application file for complete search history.

(56) References Cited

U.S. PATENT DOCUMENTS

| 2006/0086245 A1 | 4/2006 | Pitkanen et al. |
| 2012/0288616 A1 | 11/2012 | Zierhut et al. |
| (Continued) | | |

FOREIGN PATENT DOCUMENTS

| CN | 107321557 A | * | 11/2017 | ......... | B05C 11/1005 |
| CN | 112924457 A | * | 6/2021 | ......... | G01N 21/8806 |
| (Continued) | | | | | |

OTHER PUBLICATIONS

International Search Report for Application No. PCT/KR2023/005629 mailed Aug. 2, 2023, pp. 1-3.

(Continued)

*Primary Examiner* — Michael A Lyons
(74) *Attorney, Agent, or Firm* — Lerner David LLP

(57) ABSTRACT

Disclosed is a coating thickness measuring apparatus and method.
The coating thickness measuring apparatus according to an embodiment of the present disclosure includes a data obtaining unit configured to obtain thickness data indicating a thickness of a coating material applied to a contact portion of a substrate in contact with a coating roll while the substrate coated with the coating material is transported by the coating roll; and a processor configured to create a virtual memory zone having a plurality of storage areas in which correction data is distributed and stored and correct the thickness data based on the correction data pre-stored in a target storage area selected from the plurality of storage areas to generate corrected thickness data.

12 Claims, 12 Drawing Sheets

(56) References Cited

U.S. PATENT DOCUMENTS

| | | |
|---|---|---|
| 2013/0201493 A1 | 8/2013 | Ichizawa |
| 2021/0025687 A1 | 1/2021 | Ichikawa |
| 2021/0074564 A1 | 3/2021 | Sugita et al. |
| 2021/0382173 A1 | 12/2021 | Hughes et al. |
| 2023/0173527 A1 | 6/2023 | Lee et al. |
| 2025/0231020 A1* | 7/2025 | Lee ........................ G01B 21/32 |
| 2025/0244123 A1 | 7/2025 | Tsuchiya et al. |

FOREIGN PATENT DOCUMENTS

| | | | |
|---|---|---|---|
| CN | 114273163 A | 4/2022 | |
| JP | S649587 A | 1/1989 | |
| JP | H01291107 A | 11/1989 | |
| JP | H0715373 B2 | 2/1995 | |
| JP | H08031158 B2 | 3/1996 | |
| JP | H08278117 A | 10/1996 | |
| JP | H11248425 A | 9/1999 | |
| JP | 2965065 B2 | 10/1999 | |
| JP | H11276959 A | 10/1999 | |
| JP | 2000346635 A | 12/2000 | |
| JP | 2004012293 A | 1/2004 | |
| JP | 2006234760 A | 9/2006 | |
| JP | 2009047665 A | 3/2009 | |
| JP | 2012194140 A | 10/2012 | |
| JP | 2012216375 A | 11/2012 | |
| JP | 2013160581 A | 8/2013 | |
| JP | 5413655 B2 | 2/2014 | |
| JP | 2019158823 A | 9/2019 | |
| JP | 2021044288 A | 3/2021 | |
| JP | 6932527 B2 | 9/2021 | |
| JP | 2021126608 A | 9/2021 | |
| JP | 2021193373 A | 12/2021 | |
| KR | 101185003 B1 | 10/2012 | |
| KR | 101200075 B1 | 11/2012 | |
| KR | 101243573 B1 | 3/2013 | |
| KR | 20130090342 A | 8/2013 | |
| KR | 101383209 B1 | 4/2014 | |
| KR | 101442810 B1 | 9/2014 | |
| KR | 2015-0054185 A | 5/2015 | |
| KR | 101528000 B1 | 6/2015 | |
| KR | 101810025 B1 | 12/2017 | |
| KR | 102043459 B1 | 11/2019 | |
| KR | 102336266 B1 | 12/2021 | |
| KR | 20220008762 A | 1/2022 | |
| WO | WO-2010120214 A1 * | 10/2010 | ......... G01B 11/0625 |

OTHER PUBLICATIONS

Extended European Search Report including Written Opinion for Application No. 23796768.2 dated Aug. 13, 2024. 7 pgs.

International Search Report for Application No. PCT/KR2023/005631 mailed Aug. 17, 2023, 3 pages.

International Search Report for Application No. PCT/KR2023/005631 mailed Aug. 17, 2023. 4 pages.

* cited by examiner

| TEMPERATURE($T_n$) | ROUNDNESS($R_n$) |
|:---:|:---:|
| $T_1$ | $R_1$ |
| $T_2$ | $R_2$ |
| $T_3$ | $R_3$ |
| ⋮ | ⋮ |
| $T_n$ | $R_n$ |

COATING THICKNESS MEASURING APPARATUS AND METHOD

CROSS-REFERENCE TO RELATED APPLICATIONS

This application is a national stage entry under 35 U.S.C. § 371 of International Application No. PCT/KR2023/005629, filed on Apr. 25, 2023, which claims priority to Korean Patent Application Nos. 10-2022-0053732 and 10-2022-0053733, filed on Apr. 29, 2022 and Korean Patent Application No. 10-2023-0051593, filed on Apr. 19, 2023, the disclosures of which are hereby incorporated herein by reference in their entireties.

TECHNICAL FIELD

Embodiments disclosed in this document relate to a thickness measuring apparatus and method, and more particularly, to a coating thickness measuring apparatus and method capable of accurately measuring a coating thickness of a coating material applied to a substrate.

BACKGROUND ART

Currently commercialized secondary batteries include nickel cadmium batteries, nickel hydrogen batteries, nickel zinc batteries, and lithium secondary batteries, and among them, lithium secondary batteries are in the limelight because of their advantages of free charge and discharge, very low self-discharge rate, and high energy density, as no memory effect occurs compared to nickel-based secondary batteries.

Moreover, in recent years, secondary batteries have been widely used for driving or energy storage in medium-large devices such as electric vehicles or energy storage systems (ESS). Also, because of this, interest in the secondary battery is further increased, and related research and development are being performed more actively.

In general, such a secondary battery may be manufactured in a manner in which an electrode assembly and an electrolyte material are housed in a battery case and the battery case is sealed. In this case, the electrode assembly of the secondary battery may include a positive electrode, a negative electrode, and a separator interposed between the positive electrode and the negative electrode.

In this way, the positive electrode, the negative electrode, and the separator included in the electrode assembly of the secondary battery can be manufactured through a process of coating a predetermined substrate in the form of a sheet or plate with a predetermined coating material, respectively. For example, the positive electrode may be manufactured through a process of coating a surface of a substrate such as aluminum foil with a coating material including a positive electrode active material such as lithium-based oxide. The negative electrode may be manufactured through a process of coating a surface of a substrate such as copper foil with a coating material including a negative electrode active material such as a carbon material. In addition, the separator may be manufactured by coating the surface of the porous polymer substrate with a coating material including inorganic particles and a polymer binder.

In order to increase the charging capacity and energy density of these secondary batteries, each coating material should be coated with an even thickness on the surface of the corresponding substrate. That is, in order to manufacture high-quality and high-efficiency secondary battery products, while the positive electrode, the negative electrode, or the separator is being coated by the coating device, the coating thickness of the corresponding coating material must be accurately measured in real time, and the corresponding coating device or a subsequent processing device must be properly managed based on the measured coating thickness.

However, in the conventional technology, since the substrate coated with the coating material is transported through a plurality of rolls spaced apart from each other, the vibration generated from the corresponding rolls causes the substrate to shake when measuring the coating thickness, and as a result, there is a problem that the accuracy of the coating thickness measurement value is deteriorated.

In addition, since the existing technology does not consider the effect of temperature change when measuring the coating thickness, there is a problem in that the accuracy of the coating thickness measurement value is further deteriorated.

DISCLOSURE

Technical Problem

The technical problem to be solved by the present disclosure is to provide a coating thickness measuring apparatus and method capable of measuring the thickness of a coating material applied to a substrate with a high level of accuracy.

In addition, another technical problem to be solved by the present disclosure is to provide a thickness measuring apparatus and method capable of further improving the accuracy of the coating thickness measurement value by correcting the coating thickness measurement value in consideration of the effect of temperature change when measuring the thickness of the coating material applied to the substrate.

However, the technical problems to be solved by the present disclosure are not limited to the above-mentioned problems, and those skilled in the art will be able to clearly understand other technical problems of the present disclosure from the description below.

Technical Solution

A coating thickness measuring apparatus according to one aspect of the present disclosure comprises a data obtaining unit configured to obtain thickness data indicating a thickness of a coating material applied to a contact portion of a substrate in contact with a coating roll while the substrate coated with the coating material is transported by the coating roll; and a processor configured to create a virtual memory zone having a plurality of storage areas in which correction data is distributed and stored and correct the thickness data based on the correction data pre-stored in a target storage area selected from the plurality of storage areas to generate corrected thickness data.

In one embodiment, the data obtaining unit may be configured to divide an outer circumference of the coating roll into a plurality of sections to further obtain section identification data for identifying a section in contact with the contact portion of the substrate among the plurality of sections, and the processor may be configured to select a storage area corresponding to the section identification data among the plurality of storage areas as the target storage area before correcting the thickness data.

In one embodiment, the correction data pre-stored in the target storage area may include a roundness value of the section in contact with the contact portion of the substrate.

3

In one embodiment, the data obtaining unit may be configured to further obtain temperature data representing a temperature of the coating roll, and the processor may be configured to correct the thickness data based on the correction data pre-stored in the target storage area and the temperature data.

In one embodiment, the pre-stored correction data may include a data table in which roundness values for each temperature of a section in contact with the contact portion of the substrate among a plurality of sections obtained by dividing an outer circumference of the coating roll according to position are recorded.

In one embodiment, the data obtaining unit may be configured to divide an outer circumference of the coating roll into a plurality of sections and obtain roundness data representing a roundness of a corresponding section for each section, before obtaining the thickness data, and the processor may be configured to divide and store the roundness data obtained for each section by the data obtaining unit in the plurality of storage areas for each section.

In an embodiment, the data obtaining unit may include a sensing module having a thickness sensor; and a positioning module configured to adjust the position of the sensing module and cause the sensing module to sense the thickness of the coating material applied to the contact portion of the substrate through the thickness sensor to generate the thickness data.

In one embodiment, the sensing module may further include a temperature sensor for sensing a temperature of the coating roll, and the processor may be configured to correct the thickness data based on the correction data pre-stored in the target storage area and the temperature data obtained through the temperature sensor.

In one embodiment, the positioning module may include a first moving unit for moving the sensing module along a first axis; and a second moving unit for moving the sensing module along a second axis intersecting the first axis.

In one embodiment, the positioning module may further include a third moving unit for moving the sensing module along a third axis intersecting the first axis and the second axis, respectively.

In one embodiment, the positioning module may further include a rotating unit for rotating the sensing module within a predetermined rotation angle range around a predetermined rotation axis.

In an embodiment, the data obtaining unit may be included in plurality, and the plurality of data obtaining units may be spaced apart from each other in a width direction of the substrate transferred in a longitudinal direction by the coating roll.

A coating system according to another aspect of the present disclosure may comprise the coating thickness measuring apparatus according to any one of the above embodiments.

A coating thickness measuring method according to still another aspect of the present disclosure is performed by a device for measuring a thickness of a coating material applied to a substrate and comprises creating a virtual memory zone having a plurality of storage areas in which correction data is distributed and stored; obtaining thickness data indicating a thickness of a coating material applied to a contact portion of the substrate in contact with a coating roll while the substrate coated with the coating material is transported by the coating roll; and correcting the thickness data based on the correction data pre-stored in a target storage area selected from the plurality of storage areas to generate corrected thickness data.

In one embodiment, the coating thickness measuring method may further comprise obtaining temperature data representing a temperature of the coating roll, before generating the corrected thickness data, and the step of generating the corrected thickness data may include correcting the thickness data based on the correction data pre-stored in the target storage area and the temperature data.

In one embodiment, the pre-stored correction data may include a data table in which roundness values for each temperature of a section in contact with the contact portion of the substrate among a plurality of sections obtained by dividing an outer circumference of the coating roll according to position are recorded.

Advantageous Effects

According to the embodiments disclosed in this specification, while the substrate coated with the coating material is transferred by the coating rolls, for the portion of the substrate that is in contact with the coating roll among the entire substrate, the data obtaining unit is configured to obtain the thickness data of the coating material applied to the corresponding portion, so it is possible to reduce measurement errors caused by shaking of the substrate and measure the thickness of the coating material applied to the substrate with a high level of accuracy.

In addition, the processor is configured to generate a virtual memory zone having a plurality of storage areas and correct thickness data obtained by the data obtaining unit based on the correction data pre-stored in a target storage area selected from the plurality of storage areas, so it is possible to shorten the coating thickness measurement time while further improving the accuracy of the coating thickness measurement value.

In addition, the data obtaining unit is configured to further obtain temperature data representing the temperature of the coating roll, and the processor is configured to correct the thickness data based on the temperature data and the correction data pre-stored in the target storage area, so the effect of temperature change can be reflected in the coating thickness measurement value, and as a result, the accuracy and reliability of the coating thickness measurement value can be further improved.

In addition, the data obtaining unit includes a sensing module for sensing the thickness of the coating material and a positioning module for adjusting the position of the sensing module, so the sensing position of the sensing module can be optimized, and the position of the sensing module can be appropriately changed according to the size of the substrate to be measured, the relative positions of the rolls transporting the substrate to be measured, and the like.

Furthermore, one of ordinary skill in the art will clearly understand from the following description that embodiments of the present disclosure may also be used to solve various technical problems not mentioned above.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 8 is a view showing a measurement preparation state of the coating thickness measuring apparatus shown in FIG. 3.

FIG. 10 is a view showing a measurement preparation state of the coating thickness measuring apparatus shown in FIG. 9.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
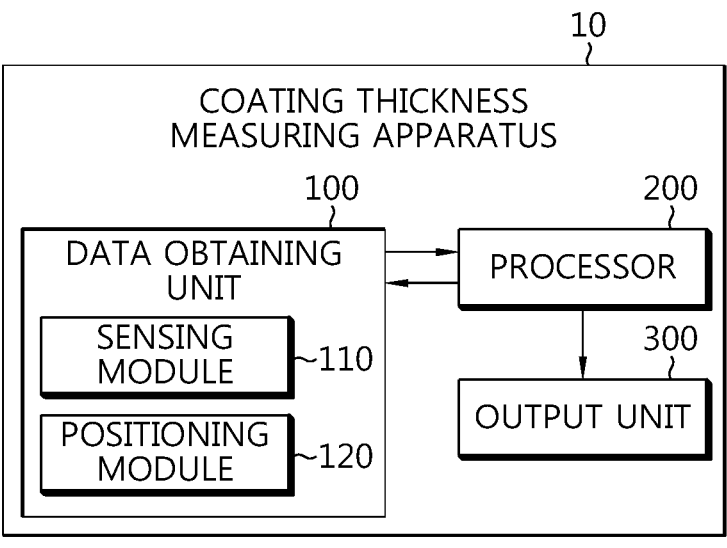
FIG. 1 is a block diagram showing a coating thickness measuring apparatus according to an embodiment of the present disclosure.

FIG. 1 is a block diagram showing a coating thickness measuring apparatus 10 according to an embodiment of the present disclosure.

As shown in FIG. 1, the coating thickness measuring apparatus 10 according to an embodiment of the present disclosure includes a data obtaining unit 100 and a processor 200. According to embodiments, the coating thickness measuring apparatus 10 may further include an output unit 300.

The data obtaining unit 100 is configured to obtain thickness data representing a thickness of a coating material applied to a contact portion of a substrate that is in contact with a coating roll among the entire substrate, while the substrate coated with the coating material is transported by the coating roll. To this end, the data obtaining unit 100 may include a sensing module 110 that senses the thickness of the coating material to generate thickness data of the coating material, and a positioning module 120 that adjusts the position of the sensing module 110.

The substrate may be a metal foil constituting a positive electrode or a negative electrode of a secondary battery, or a porous polymer film constituting a separator of a secondary battery.

In addition, the coating material applied to the substrate may be a slurry-state material in which fine solid particles and a solvent are mixed, or a powder-state material in which different solid particles are mixed.

For example, when the coating material is an electrode coating material, the coating material may include an electrode active material, and may optionally further include a polymer binder, a conductive material, a filler, and the like according to embodiments. On the other hand, when the coating material is a separator coating material, the coating material may include inorganic particles, and may optionally further include a polymer binder, a dispersant, a heat-resistant filler, and the like according to embodiments.

The processor 200 is configured to generate a virtual memory zone having a plurality of storage areas before the data obtaining unit 100 obtains the thickness data. In this case, the plurality of storage areas of the virtual memory zone may be configured to correspond to a plurality of sections obtained by dividing the outer circumference of the coating roll according to positions. In the plurality of storage areas, correction data used for thickness data correction may be distributed and stored.

To this end, the data obtaining unit 100 may be configured to divide the entire outer circumference of the coating roll into a plurality of sections before obtaining thickness data, and obtain roundness data representing the roundness of the corresponding section for each section.

Then, the processor 200 may divide and store roundness data obtained for each section in the plurality of storage areas for each section.

Next, the processor 200 is configured to correct the thickness data obtained by the data obtaining unit 100 based on correction data pre-stored in a target storage area selected from the plurality of storage areas to generate corrected thickness data.

The output unit 300 may be configured to output the corrected thickness data generated by the processor 200 visually, audibly or audiovisually. To this end, the output unit 300 may optionally include a display, printer, speaker, and the like.

In one embodiment, the data obtaining unit 100 may be configured to divide the outer circumference of the coating roll into a plurality of sections and further obtain section identification data identifying a section in contact with the contact portion of the substrate among the plurality of sections.

In this case, the section identification data may include an identification number assigned to each section, or may include an angle formed by a predetermined first center line among center lines passing through the center of the coating roll and a second center line passing through the corresponding section.

In addition, before correcting the obtained thickness data, the processor 200 may select a storage area corresponding to the section identification data among the plurality of storage areas as the target storage area and correct the obtained thickness data by using correction data pre-stored in the target storage area.

For example, the correction data pre-stored in the target storage area may include a roundness value of a section in contact with the contact portion of the substrate among the plurality of sections. In this case, the processor 200 may generate corrected thickness data by removing an error according to the roundness value of the contacted section from the coating thickness value indicated by the obtained thickness data.

In one embodiment, the data obtaining unit 100 may be configured to further obtain temperature data representing the temperature of the coating roll. To this end, the data obtaining unit 100 may include a temperature sensor. In this case, the temperature sensor may be configured as a non-contact temperature sensor such as an infrared temperature sensor.

Also, the processor 200 may correct the obtained thickness data based on the correction data pre-stored in the target storage area and temperature data obtained by the data obtaining unit 100.

In this case, the correction data pre-stored in the target storage area may include a data table in which roundness values for each temperature of a section in contact with the contact portion of the substrate among a plurality of sections in which the outer circumference of the coating roll is divided according to position are recorded.

For example, the processor 200 may check a roundness value of the section corresponding to the obtained temperature data in a data table pre-stored in the target storage area, and correct the obtained thickness data using the checked roundness value. That is, the processor 200 may generate corrected thickness data by removing an error according to the confirmed roundness value from the coating thickness value indicated by the obtained thickness data.

Figure 2:
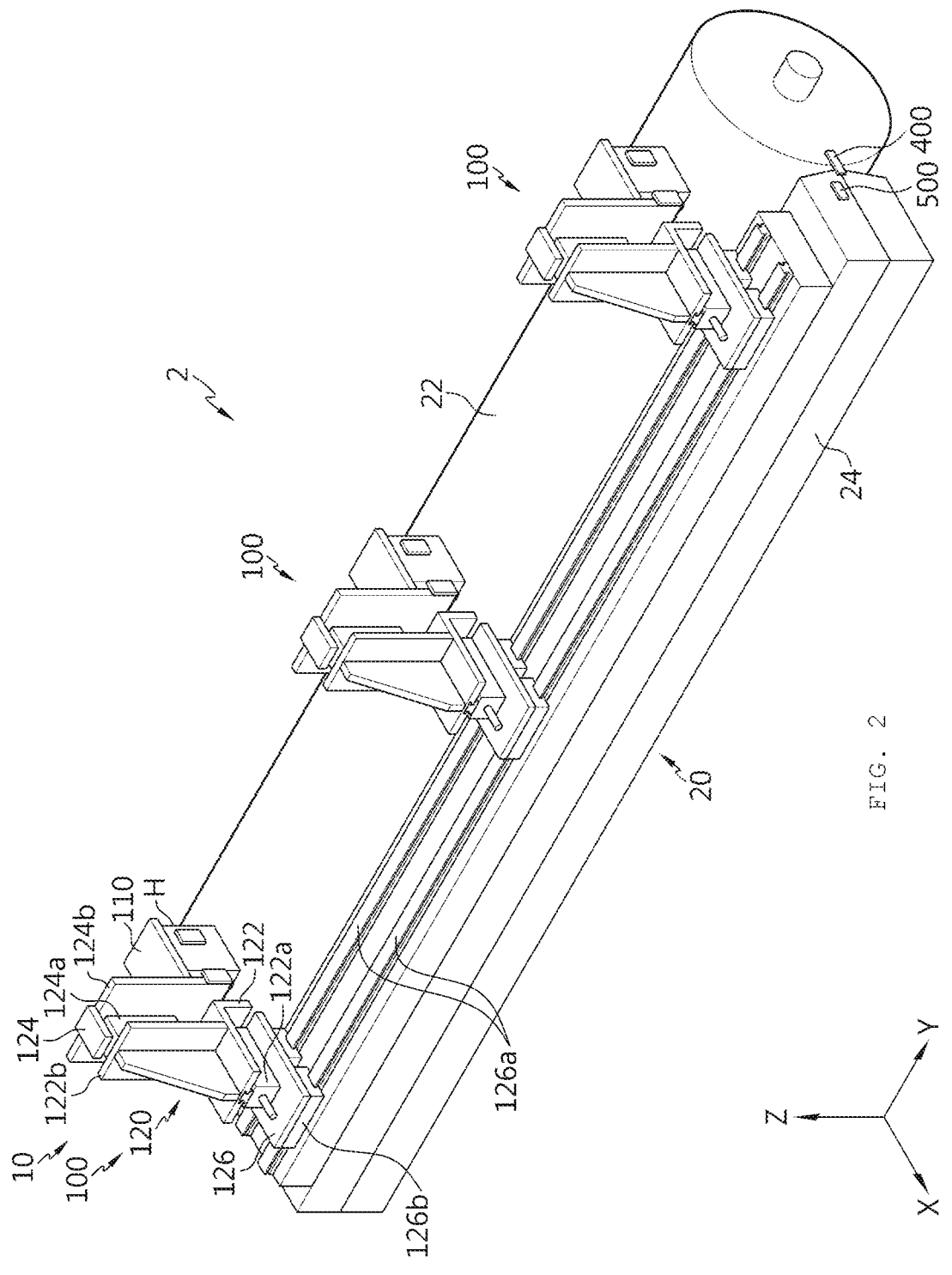
FIG. 2 is a view showing a coating system according to an embodiment of the present disclosure.

FIG. 2 is a view showing a coating system 2 according to an embodiment of the present disclosure.

As shown in FIG. 2, the coating system 2 may include a coating thickness measuring apparatus 10 according to the present disclosure and a coating device 20.

As described above, the coating thickness measuring apparatus 10 may be configured to measure the thickness of a coating material applied to a substrate by the coating device 20. In this case, the coating device 20 may include a coating roll 22 that supports and transfers a substrate, and a coater 24 that discharges a coating material in a slurry state onto the substrate supported and contacted by the coating roll 22.

In addition, the coating thickness measuring apparatus 10 may include a data obtaining unit 100 and a processor 200 as described with reference to FIG. 1.

While the substrate coated with the coating material is supported and transported by the coating roll 22, the data obtaining unit 100 may be configured to obtain thickness data representing the thickness of the coating material applied to the contact portion of the substrate in contact with the coating roll 22 among the entire substrate. To this end, the data obtaining unit 100 may include a sensing module 110 and a positioning module 120.

The sensing module 110 may be configured to generate thickness data of the coating material by sensing the thickness of the coating material applied to the substrate. To this end, the sensing module 110 may include a thickness sensor. For example, the thickness sensor may include a displacement sensor that irradiates light or laser onto the coating material, obtains reflected light or laser, and measures the thickness of the corresponding coating material. This thickness sensor may be coupled to and supported by the housing H of the sensing module 110.

The positioning module 120 may be configured to adjust the position of the sensing module 110. That is, the positioning module 120 may adjust the position of the sensing module 110 so that the sensing module 110 senses the thickness of the coating material applied to the contact portion of the substrate in contact with the coating roll 22 through the thickness sensor.

To this end, the positioning module 120 may include a first moving unit 122 and a second moving unit 124. According to embodiments, the positioning module 120 may further include a third moving unit 126.

The first moving unit 122 may be configured to move the sensing module 110 along a first axis (e.g., X axis). To this end, the first moving unit 122 may include a first actuator 122a and a first support structure 122b moved in a first axis direction by the first actuator 122a.

The second moving unit 124 may be configured to move the sensing module 110 along a second axis (e.g., Z axis) intersecting the first axis. To this end, the second moving unit 124 may include a second actuator 124a coupled to the first support structure 122b and a second support structure 124b moved in the second axis direction by the second actuator 124a. In this case, the sensing module 110 may be coupled to the second support structure 124b of the second moving unit 124.

The third moving unit 126 may be configured to move the sensing module 110 along a third axis (e.g., Y axis) intersecting the first axis and the second axis, respectively. To this end, the third moving unit 126 may include a guide rail 126a extending in the third axis direction and a base structure 126b configured to be movable along the guide rail 126a.

The guide rail 126a of the third moving unit 126 may be coupled to and fixed to the outer surface of the coater 24. Also, the first actuator 122a of the first moving unit 122 may be coupled to the base structure 126b of the third moving unit 126.

Meanwhile, the coating thickness measuring apparatus 10 may include a plurality of the above-described data obtaining units 100. In this case, the plurality of data obtaining units 100 may be spaced apart from each other in the width direction (X-axis direction) of the substrate being transferred in the longitudinal direction by the coating roll 22. In addition, the distance between the data obtaining units may be adjusted by the third moving unit 126.

In one embodiment, the coating thickness measuring apparatus 10 may further include a rotation detecting module 400. The rotation detecting module 400 may be configured to detect at least one of a rotation angle and a rotation speed of the coating roll 22. To this end, the rotation detecting module 400 may include a rotary encoder.

The rotation detecting module 400 may detect the rotation angle or rotation speed of the coating roll 22, and sense a section in contact with the contact portion of the substrate to which the coating material is applied among the plurality of sections constituting the outer circumference of the coating roll 22, and generate section identification data that identifies the sensed section. The rotation detecting module 400 may provide the generated section identification data to the data obtaining unit 100.

Then, the data obtaining unit 100 may transfer the thickness data of the coating material applied to the contact portion of the substrate and the section identification data of the section in contact with the contact portion of the substrate to the processor 200. To this end, the data obtaining unit 100 may be configured to communicate with the processor 200 by wire or wirelessly.

The processor 200 may select a target storage area corresponding to the section identification data among a plurality of storage areas of the virtual memory zone, and correct the thickness data based on correction data pre-stored in the target storage area.

The processor 200 may selectively include a central processing unit (CPU), an application-specific integrated circuit (ASIC), a chipset, a logic circuit, registers, and the like in order to execute various control logics required by the present disclosure. Control logic executed by the processor 200 may be implemented as software, and the corresponding software may be stored in a memory built in the processor 200 or a memory located outside the processor 200. The processor 200 may be disposed in the housing H of the data obtaining unit 100 or in a predetermined terminal located outside the data obtaining unit 100.

In one embodiment, the coating thickness measuring apparatus 10 may be configured to perform a correction data obtaining procedure before performing a coating process on a substrate.

In this case, the data obtaining unit 100 may obtain roundness data indicating the roundness value of the corresponding section for each section of the coating roll 22 using a displacement sensor before the coating process is performed, and transmit the roundness data and the section identification data of each section to the processor 200.

Then, the processor 200 may divide and store the roundness data and section identification data transmitted from the data obtaining unit 100 for each section in a plurality of storage areas of the virtual memory zone.

In addition, the coating thickness measuring apparatus 10 may repeat the above-described correction data obtaining procedure while changing the temperature of the coating roll 22.

In one embodiment, the coating thickness measuring apparatus 10 may further include a vibration measuring module 500. The vibration measuring module 500 may be configured to measure a natural frequency of vibration generated by the coating device 20. To this end, the vibration measuring module 500 may include a vibration sensor.

Based on the measured natural frequency, the vibration measuring module 500 may generate correction data related to an error for each section of the coating roll 22 caused by vibration, and provide the data to the data obtaining unit 100. Then, the data obtaining unit 100 may transfer the correction data for the error of each section to the processor 200, and the processor 200 may separate and store the correction data for the error of each section in the plurality of storage areas of the virtual memory zone for each section.

Figure 3:
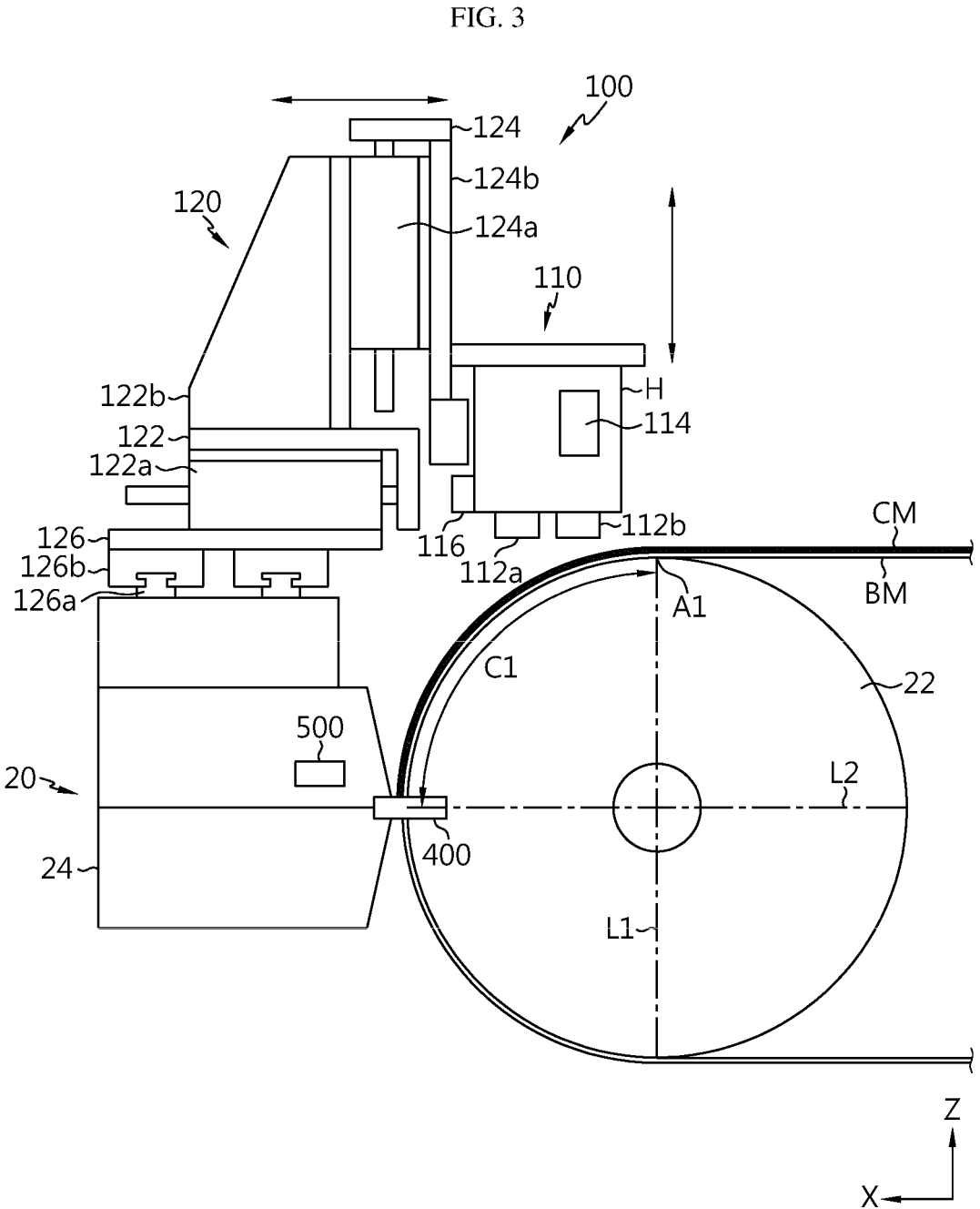
FIG. 3 is a view showing the coating thickness measuring apparatus of the coating system shown in FIG. 2.

FIG. 3 is a view showing the coating thickness measuring apparatus 10 of the coating system shown in FIG. 2.

As shown in FIG. 3, the data obtaining unit 100 of the coating thickness measuring apparatus 10 may include a sensing module 110 and a positioning module 120.

The sensing module 110 may measure the coating thickness of a part of the contact portion C1 of the substrate BM that is in contact with the outer circumference of the coating roll 22. To this end, the sensing module 110 may include a thickness sensor 112a, 112b.

In one embodiment, the thickness sensor 112a, 112b of the sensing module 110 may be configured as a non-contact displacement sensor. In this case, the thickness sensor 112a, 112b may include a light applying unit 112a and a light obtaining unit 112b.

The light applying unit 112a may be configured to apply light or laser to the surface of the coating material CM applied to the substrate BM. To this end, the light applying unit 112a may include a light source provided inside the housing H and a lens for applying light generated by the light source to the surface of the substrate BM.

In particular, the light applying unit 112a may be configured to apply light to the contact portion C1 of the substrate BM that is in contact with the coating roll 22 among the entire substrate BM. For example, in FIG. 3, the portion of the substrate BM in contact with the coating roll 22 is a portion located on the left side of the vertical center line L1 of the coating roll 22, and the contact portion C1, which is the target of coating thickness measurement, is a portion located on the upper side based on the horizontal center line L2.

The light obtaining unit 112b may be configured to obtain light applied by the light applying unit 112a and reflected from the surface of the coating material CM. To this end, the light obtaining unit 112b may include a lens configured to collect reflected light or laser and a light receiving element such as a photo diode or complementary metal-oxide semiconductor (CMOS). In this case, light reflected from the surface of the coating material CM and passing through the light receiving lens may be received by the light receiving element disposed inside the housing H and converted into an electrical signal.

The sensing module 110 may generate thickness data about the thickness of the coating material CM based on the light obtained by the light obtaining unit 112b.

As an example, the sensing module 110 may obtain a wavelength domain spectrum for the amplitude ratio or phase difference of light received by the light receiving element, and performs a fast Fourier transform thereto to calculate the thickness value of the coating material CM. As another example, the sensing module 110 may measure the TOF (Time Of Flight) of the light applied by the light applying unit 112a and obtained by the light obtaining unit 112b, and convert the measured TOF into a distance to calculate the thickness value of the coating material CM.

In the case of a conventional coating thickness measuring apparatus, since the thickness is measured for a portion of the substrate moving in the air between two rolls that transport a coated substrate, shaking occurs on the substrate due to the vibration of the equipment or the difference in roundness between rolls or the like, and as a result, it is difficult to accurately measure the coating thickness of the substrate.

On the other hand, the coating thickness measuring apparatus 10 according to the present disclosure is configured to measure the thickness of the coating material CM applied to a portion of the substrate in which shaking is minimized among the entire substrate BM, that is, the contact portion of the substrate supported in contact with the coating roll 22, so measurement errors caused by shaking of the substrate may be reduced and measurement accuracy may be improved.

For example, the sensing module 110 may be configured to measure the thickness of the coating material CM with respect to the end A1 of the contact portion C1 having the minimum curvature among the contact portions C1 of the substrate BM that are supported in contact with the coating roll 22. In this way, measurement accuracy can be further improved by measuring the coating thickness for the end A1 of the contact portion C1 where the shaking is small and the degree of curvature is minimal.

In one embodiment, the sensing module 110 may further include a temperature sensor 114 for sensing the temperature of the coating roll 22. The temperature sensor 114 may be configured as a non-contact temperature sensor such as an infrared temperature sensor.

In addition, the processor 200 of the coating thickness measuring apparatus 10 may correct the thickness data obtained by the data obtaining unit 100, based on the correction data pre-stored in the target storage area among the plurality of storage areas of the virtual memory zone and the temperature data obtained through the temperature sensor 114.

In this case, the correction data pre-stored in the target storage area may include a data table in which roundness values for each temperature of the section in contact with the thickness measurement target of the substrate among the plurality of sections obtained by dividing the outer circumference of the coating roll 22 are recorded.

For example, the processor 200 may check a roundness value of the section corresponding to the obtained temperature data in a data table pre-stored in the target storage area, and correct the obtained thickness data using the checked roundness value.

In one embodiment, the coating thickness measuring apparatus 10 may further include a coating detecting module 116. The coating detecting module 116 may be configured to detect the coating material CM applied to the substrate BM. For example, the coating detecting module 116 may be configured to detect at least one of whether the coating material is applied, the application position, and the width of the applied coating material. To this end, the coating detecting module 116 may include a photoelectric sensor.

In this case, the sensing module 110 may be configured to start measuring the thickness of the coating material CM after the coating material CM is detected by the coating detecting module 116.

The coating detecting module 116 may be disposed in the housing H of the sensing module 110 or may be disposed in the second support structure 124*b* of the second moving unit 124 that moves the sensing module 110.

Meanwhile, the positioning module 120 may adjust the position of the sensing module 110, before the sensing module 110 senses the thickness of the coating material CM. That is, the positioning module 120 may adjust the position of the sensing module 110 so that the sensing module 110 senses the thickness of the coating material CM applied to the contact portion of the substrate in contact with the coating roll 22 among the entire substrate BM.

In one embodiment, the positioning module 120 may be configured to adjust the position of the sensing module 110 according to a result of detecting a coating material by the coating detecting module 116.

Also, as described above with reference to FIG. 2, the positioning module 120 may include a first moving unit 122 and a second moving unit 124. According to embodiments, the positioning module 120 may further include a third moving unit 126.

The first moving unit 122 may move the sensing module 110 along a first axis (e.g., X axis). To this end, the first moving unit 122 may include a first actuator 122*a* and a first support structure 122*b* moved in a first axis direction by the first actuator 122*a*.

The second moving unit 124 may move the sensing module 110 along a second axis (e.g., Z axis) intersecting the first axis. To this end, the second moving unit 124 may include a second actuator 124*a* coupled to the first support structure 122*b* and a second support structure 124*b* moved in the second axis direction by the second actuator 124*a*. In this case, the sensing module 110 may be coupled to the second support structure 124*b* of the second moving unit 124.

The third moving unit 126 may move the sensing module 110 along a third axis (e.g., Y axis) intersecting the first axis and the second axis, respectively. To this end, the third moving unit 126 may include a guide rail 126*a* extending in the third axis direction and a base structure 126*b* configured to be movable along the guide rail 126*a*.

The guide rail 126*a* of the third moving unit 126 may be coupled to and fixed to the outer surface of the coater 24. Also, the first actuator 122*a* of the first moving unit 122 may be coupled to the base structure 126*b* of the third moving unit 126.

Meanwhile, the coating roll 22 of the coating device 20 has a cylindrical shape, and may support and transfer the substrate BM in contact with its outer circumference.

In addition, the coater 24 of the coating device 20 may continuously apply the coating material CM to the surface of the substrate BM supported in contact with the outer circumference of the coating roll 22. In this case, the coater 24 may be implemented as a slot die coater that discharges the coating material CM in a slurry state through a slot.

The coater 24 may be disposed on one side of the coating roll 22 and discharge the coating material CM toward the coating roll 22. For example, the coater 24 may be disposed on the horizontal center line L2 of the coating roll 22, but is not limited thereto.

Figure 4:
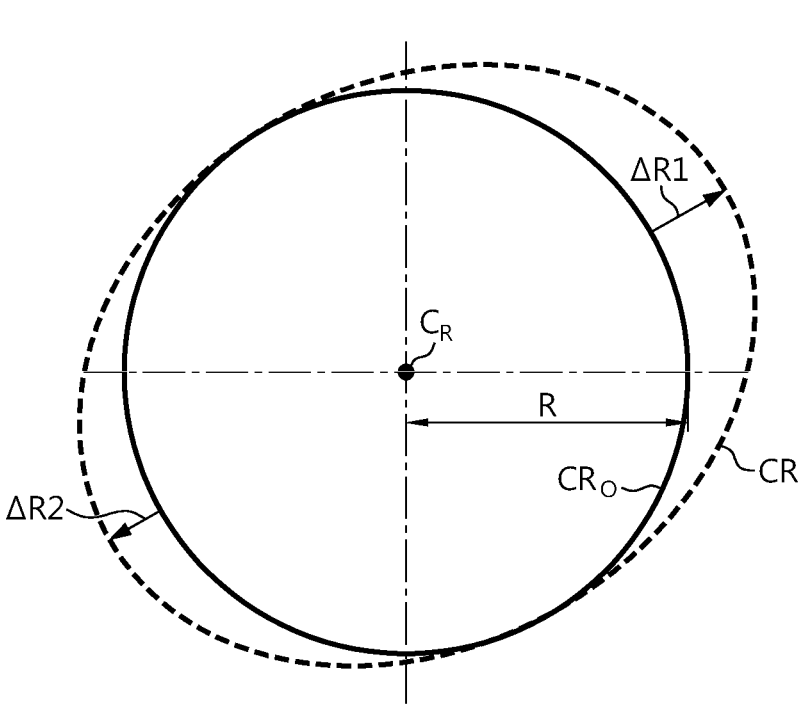
FIG. 4 is a cross-sectional view showing a coating roll applicable to the coating system according to the present disclosure.

FIG. 4 is a cross-sectional view showing a coating roll applicable to the coating system 2 according to the present disclosure.

As shown in FIG. 4, the cross section of an ideal coating roll $CR_o$ has a perfect circle shape with a radius R and with the rotation center CR of the coating roll $CR_o$ as the center of the circle.

However, the cross section of the actual coating roll CR is not a perfect circle, and each section of the coating roll CR has an error ($\Delta R1$, $\Delta R2$) according to roundness. Therefore, when measuring the thickness of the coating material coated on the portion of the substrate in contact with the outer circumference of the actual coating roll CR, the corresponding measurement value includes an error due to roundness, deteriorating the accuracy and reliability of the corresponding measurement value.

Therefore, the coating thickness measuring apparatus 10 according to an embodiment of the present disclosure may divide the outer circumference of the coating roll into a plurality of sections, obtain roundness data representing the roundness value of each section in advance, and correct the thickness data related to the coating thickness obtained later by using the correction data including the obtained roundness data.

Figure 5:
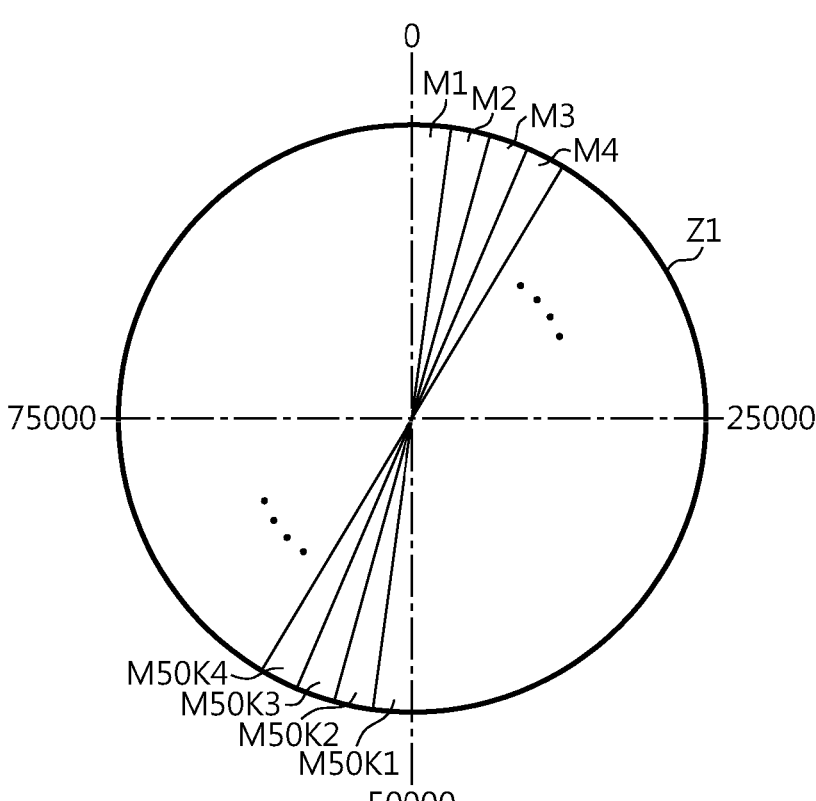
FIG. 5 is a view showing an example of a virtual memory zone created by the coating thickness measuring apparatus according to the present disclosure.

FIG. 5 is a view showing an example of a virtual memory zone Z1 created by the coating thickness measuring apparatus according to the present disclosure.

As shown in FIG. 5, the virtual memory zone Z1 may have a plurality of storage areas M1, M2, M3, etc. In this case, the plurality of storage areas may respectively correspond to a plurality of sections obtained by dividing the outer circumference of the coating roll 22 according to the position on the circumference. For example, when the outer circumference of the coating roll 22 is divided into 100,000 sections, the virtual memory zone Z1 may have 100,000 storage areas.

In addition, correction data including a roundness value of a corresponding section may be stored in each storage area.

Figures 6, 7:
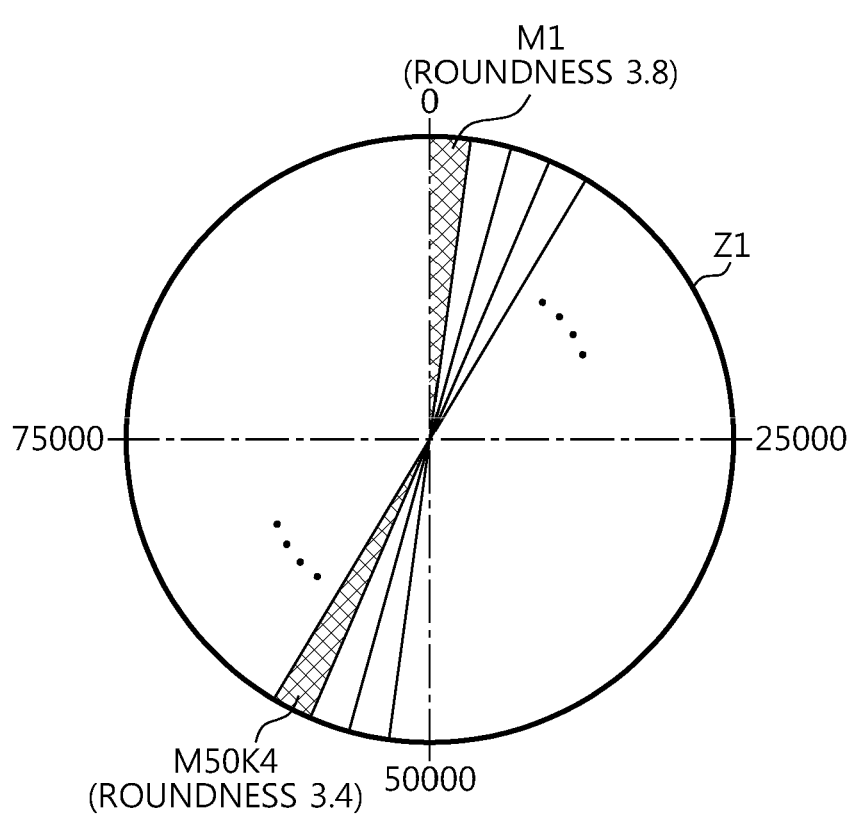
FIG. 6 is a view showing a correction data storage state in the virtual memory zone shown in FIG. 5.
FIG. 7 is a view showing an example of correction data stored in the storage area of the virtual memory zone.

FIG. 6 is a view showing a correction data storage state in the virtual memory zone Z1 shown in FIG. 5.

As shown in FIG. 6, the roundness value (e.g., 3.8) of the first section among the plurality of sections dividing the outer circumference of the coating roll 22 according to position may be stored in the first storage area M1 among the plurality of storage areas of the virtual memory zone Z1.

In addition, the roundness value (e.g., 3.4) of the $50004^{th}$ section among the plurality of sections may be stored in the $50004^{th}$ storage area M50K4 among the plurality of storage areas of the virtual memory zone Z1.

In this way, roundness values for each section of the coating roll 22 may be divided and stored for each section in the plurality of storage areas of the virtual memory zone Z1.

FIG. 7 is a view showing an example of correction data stored in the storage area of the virtual memory zone.

As shown in FIG. 7, the correction data stored in each storage area of the virtual memory zone Z1 may include a data table in which roundness values of each temperature of the section corresponding to the storage area among the plurality of sections obtained by dividing the outer circumference of the coating roll 22 according to position are recorded.

For example, a data table stored in the first storage area of the virtual memory zone Z1 may include roundness values for each temperature of a section corresponding to the first storage area among the plurality of sections of the coating roll 22.

Figure 8:
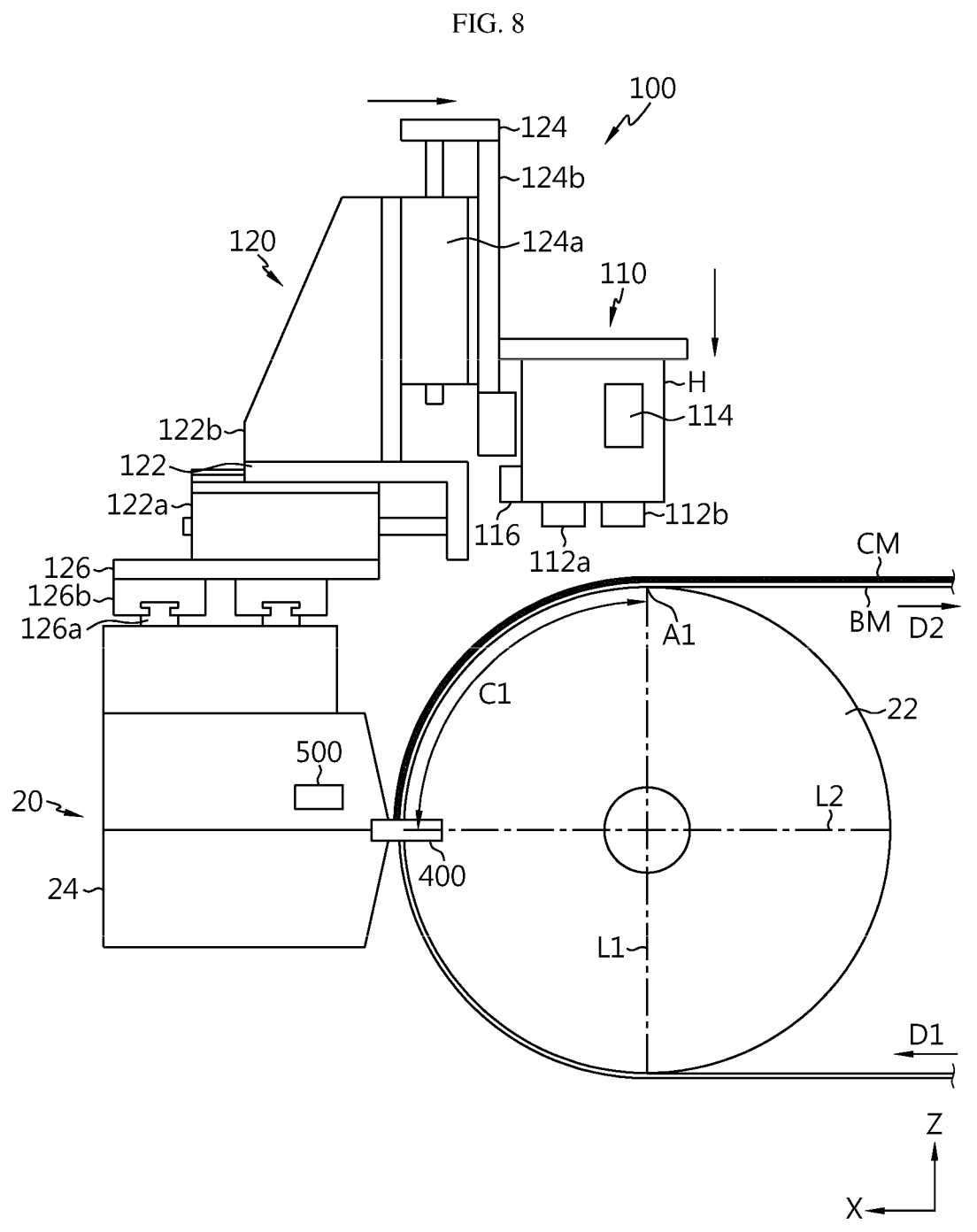

FIG. 8 is a view showing a measurement preparation state of the coating thickness measuring apparatus 10 shown in FIG. 3.

As shown in FIG. 8, the data obtaining unit 100 of the coating thickness measuring apparatus 10 may perform a measurement preparation operation to measure the thickness of the coating material CM applied to the substrate BM by the coating device 20.

That is, the positioning module 120 of the data obtaining unit 100 may adjust the position of the sensing module 110 to cause the sensing module 110 to sense the thickness of the coating material CM applied to the contact portion C1 of the substrate in contact with the coating roll 22, particularly the end A1 of the corresponding contact portion C1, among the entire substrate BM. For reference, the position of the contact portion C1 or the end A1 of the contact portion C1 may be changed according to the transfer direction D1, D2 of the substrate BM.

For example, the first moving unit 122 of the positioning module 120 may move the sensing module 110 to the right along the X-axis and place the sensing module 110 above the end A1 of the contact portion C1. To this end, the first moving unit 122 may include a first actuator 122*a* and a first support structure 122*b* moved in the X-axis direction by the first actuator 122*a*.

Next, the second moving unit 124 of the positioning module 120 may move the sensing module 110 downward along the Z-axis to bring the sensing module 110 closer to the end A1 of the contact portion C1. To this end, the second moving unit 124 may include a second actuator 124*a* coupled to the first support structure 122*b* and a second support structure 124*b* moved in the Z-axis direction by the second actuator 124*a*. In this case, the sensing module 110 may be coupled to the second support structure 124*b* of the second moving unit 124.

Figure 9:
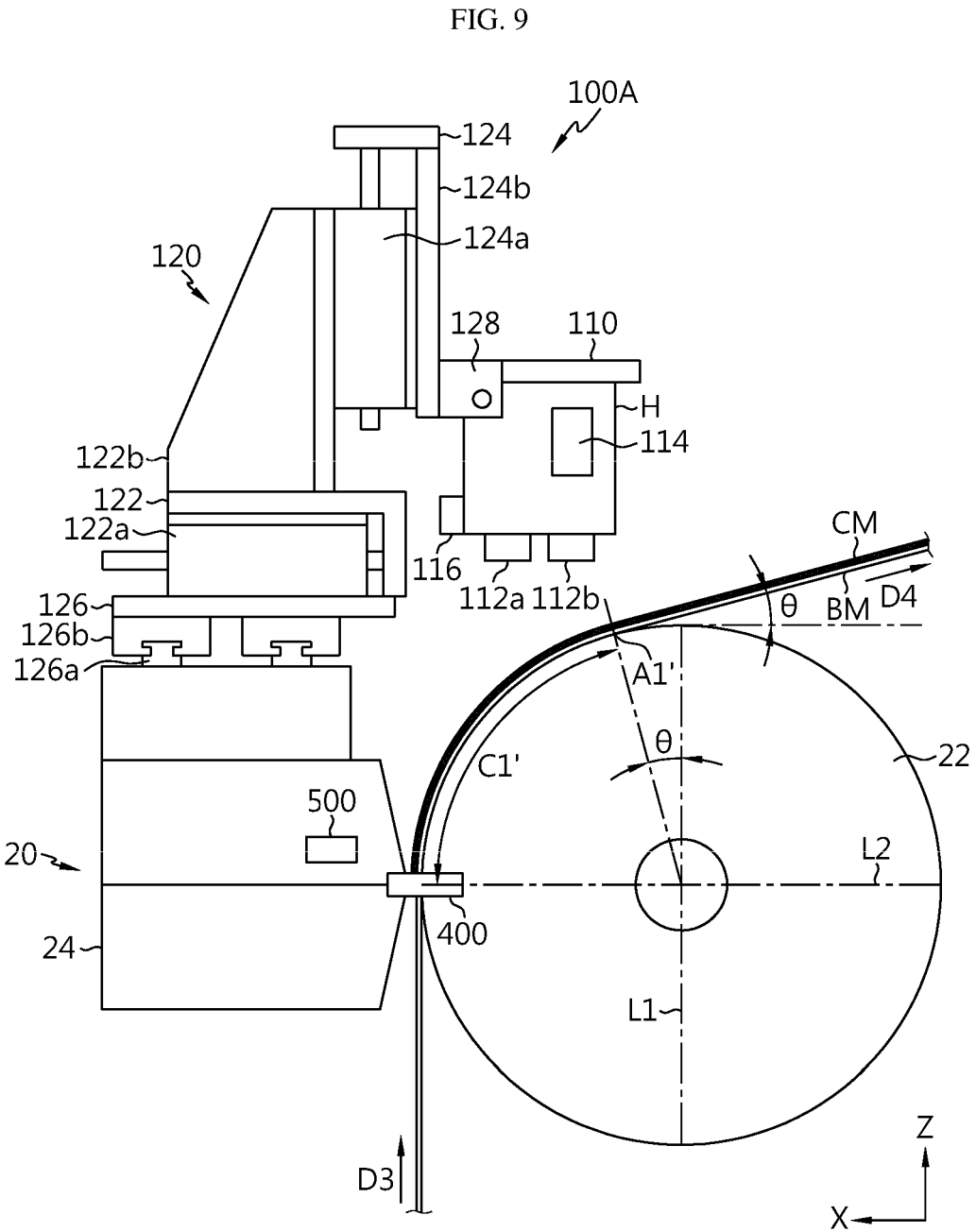
FIG. 9 is a view showing a coating thickness measuring apparatus according to a modified embodiment of the present disclosure.

FIG. 9 is a view showing a coating thickness measuring apparatus according to a modified embodiment of the present disclosure.

As shown in FIG. 9, the data obtaining unit 100A of the coating thickness measuring apparatus according to a modified embodiment of the present disclosure may include a sensing module 110 and a positioning module 120, like the data obtaining unit 100 described above.

It should be noted that the positioning module 120 of the data obtaining unit 100A may further include a rotating unit

128. The positioning module 120 may further include a rotating unit 128 that rotates the sensing module 110 within a predetermined rotation angle range around a predetermined rotation axis. To this end, the rotating unit 128 may include a servo motor and a rotary shaft for rotating the sensing module 110 by a driving force of the servo motor.

For example, when the substrate BM introduced in the vertical direction (Z-axis direction) is moved at a predetermined angle ($\theta$) with the horizontal direction (X-axis direction) after being coated while passing by the coating roll 22, the length of the contact portion C1' of the substrate in contact with the coating roll 22 and the position of the end A1' of the corresponding contact portion C1' are different from those in FIG. 8. That is, the length of the contact portion C1' is reduced, and the end A1 of the corresponding contact portion C1 is located at a point away from the vertical center line L1 by a predetermined angle ($\theta$) in a counterclockwise direction.

Figure 10:
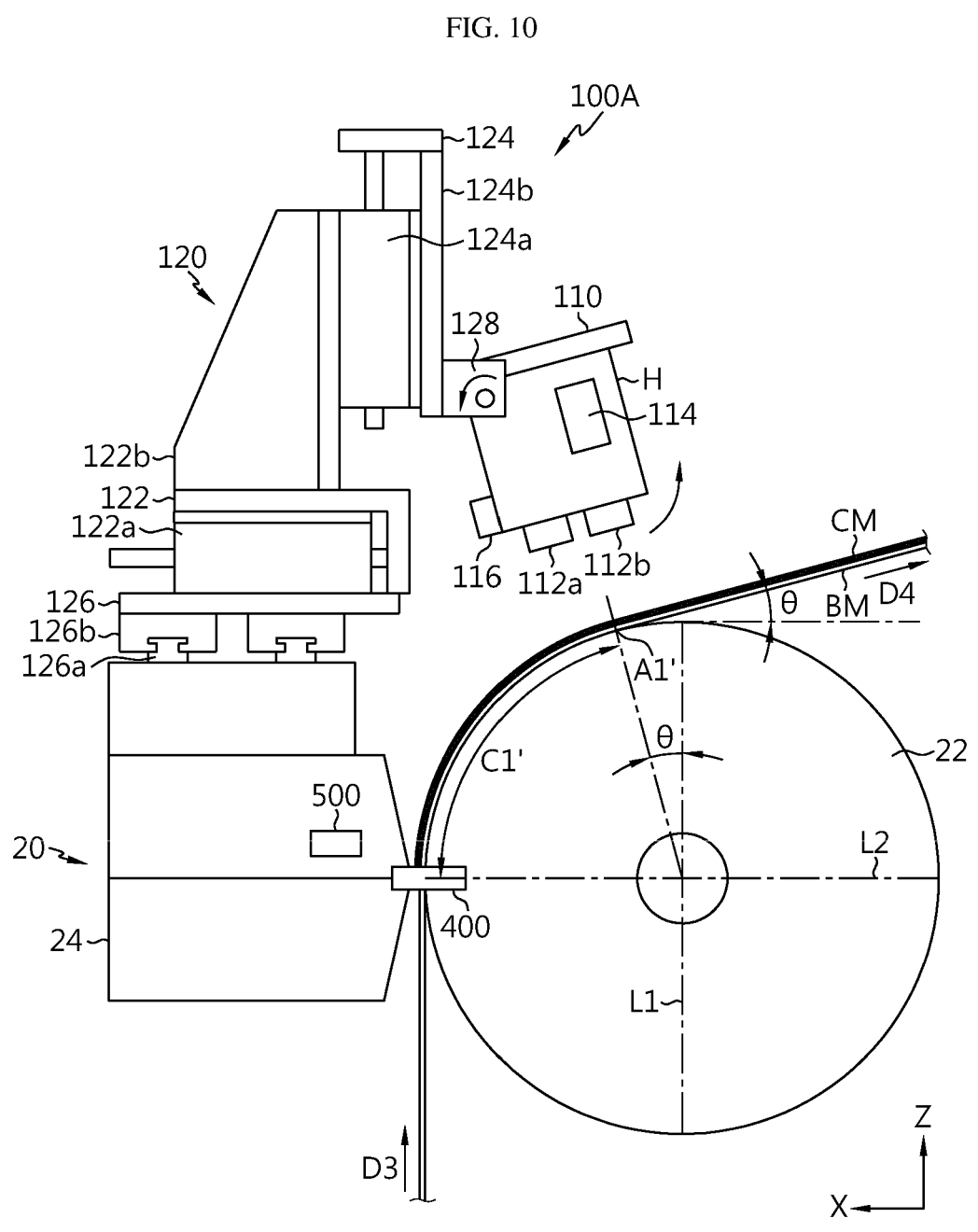

FIG. 10 is a view showing a measurement preparation state of the coating thickness measuring apparatus shown in FIG. 9.

As shown in FIG. 10, the rotating unit 128 of the positioning module 120 rotates the sensing module 110 in a counterclockwise direction by a predetermined angle ($\theta$) so that the thickness direction of the coating material CM applied to the end (A1') of the contact portion (C1') of the substrate BM and the sensing direction of the sensing module 110 may be matched.

That is, the coating thickness measuring apparatus according to a modified embodiment of the present disclosure can be applied to coating systems of various structures, and can measure the thickness of a coating material applied to a corresponding substrate with a high level of accuracy regardless of the transport direction of the substrate.

Figure 11:
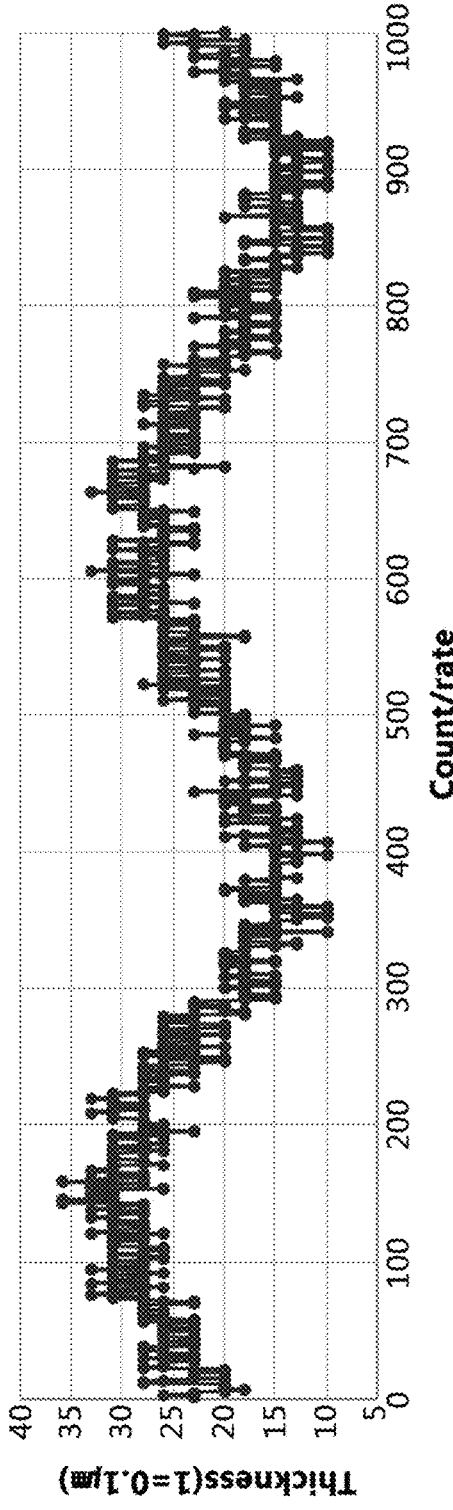
FIG. 11 is a graph showing coating thickness values measured through a general displacement sensor.

FIG. 11 is a graph showing coating thickness values measured through a general displacement sensor.

As shown in FIG. 11, when the outer circumference of the coating roll 22 is divided into 1,000 sections according to the position on the circumference, the coating thickness value measured for the contact portion of the substrate in contact with each section includes an error according to the roundness of the corresponding section. As a result, the coating thickness values continuously measured through the displacement sensor exhibit large deviations from each other even when the thickness of the coating material applied to the substrate is actually uniform.

Figure 12:
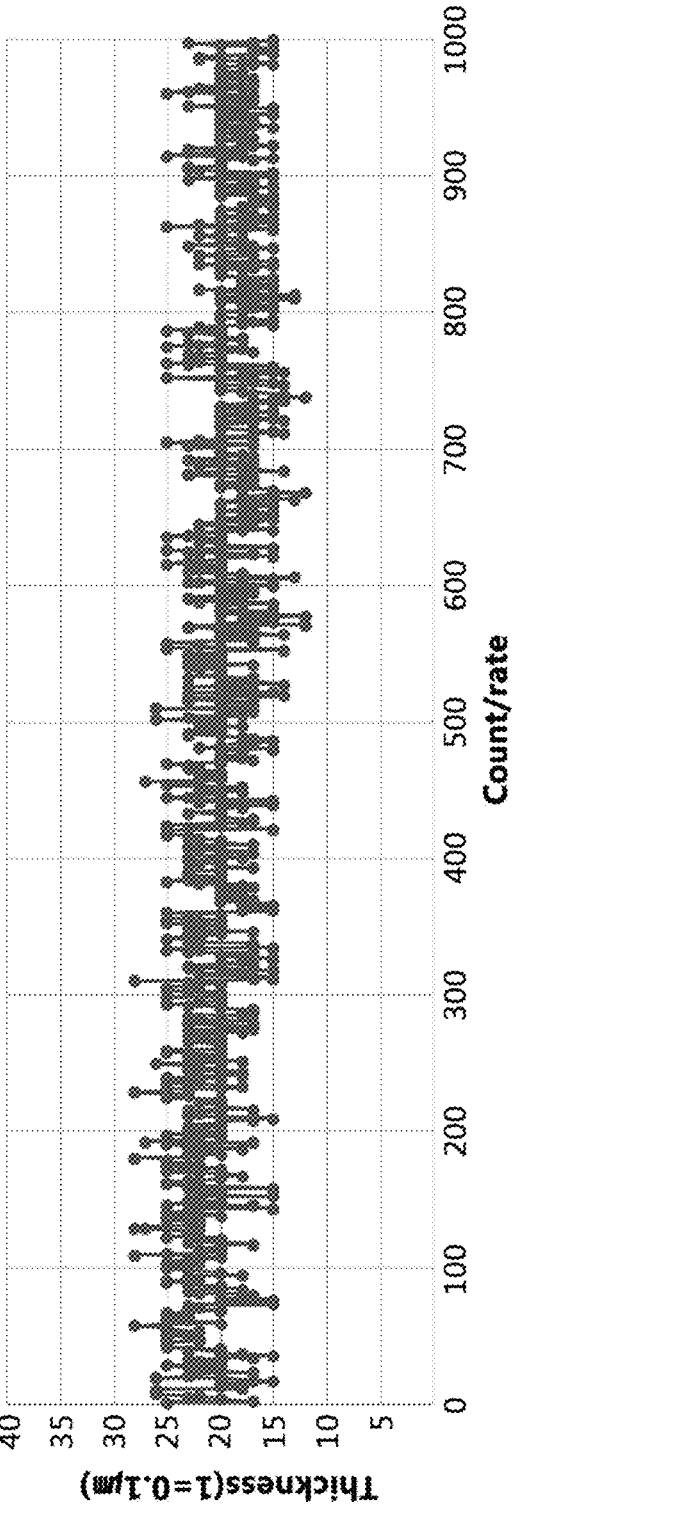
FIG. 12 is a graph showing coating thickness values corrected according to an embodiment of the present disclosure.

FIG. 12 is a graph showing coating thickness values corrected according to an embodiment of the present disclosure.

As shown in FIG. 12, since the coating thickness values corrected according to an embodiment of the present disclosure do not include an error due to the temperature of the coating roll and the roundness of each section at the time of measurement, the coating thickness values exhibit only a deviation corresponding to the difference in actual thickness of the coating material.

Figure 13:
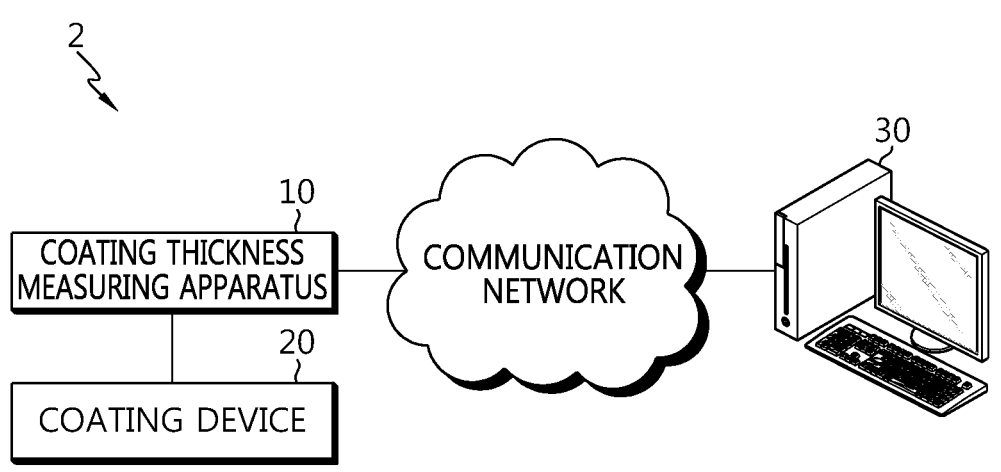
FIG. 13 is a view showing a coating system according to an embodiment of the present disclosure.

FIG. 13 is a view showing a coating system 2 according to an embodiment of the present disclosure.

As shown in FIG. 13, the coating system 2 according to an embodiment of the present disclosure includes the above-described coating thickness measuring apparatus 10 and a coating device 20, and may further include a management server 30 according to embodiments.

The management server 30 may communicate with the coating thickness measuring apparatus 10 and the coating device 20 through a communication network and may be configured to manage the coating thickness measuring apparatus 10 and the coating device 20. In this case, the communication network may include various types of wired or wireless networks such as a local area network (LAN), a wide area network (WAN), a mobile radio communication network, and wireless broadband Internet (Wibro).

For example, the management server 30 may determine whether the coating device 20 is normally operating by using the thickness data provided from the coating thickness measuring apparatus 10. When it is determined that the coating device 20 operates abnormally, the management server 30 may generate an alarm through a display or a speaker or stop the coating device 20.

In one embodiment, the management server 30 may be configured to display thickness data provided from the coating thickness measuring apparatus 10 on a display and to transfer feedback information input by a manager to the coating thickness measuring apparatus 10. In this case, the feedback information transmitted to the coating thickness measuring apparatus 10 may include weight information for one or two or more of correction data factors (e.g., temperature, roundness, vibration, etc.) used for correction of thickness data. The coating thickness measuring apparatus 10 receiving the feedback information may reflect the weight information when correcting thickness data.

The management server 30 may be implemented as a computer such as a desktop, laptop, or notebook, but is not limited thereto, and may be implemented as any type of computing device having a computing function and a communication function.

Figure 14:
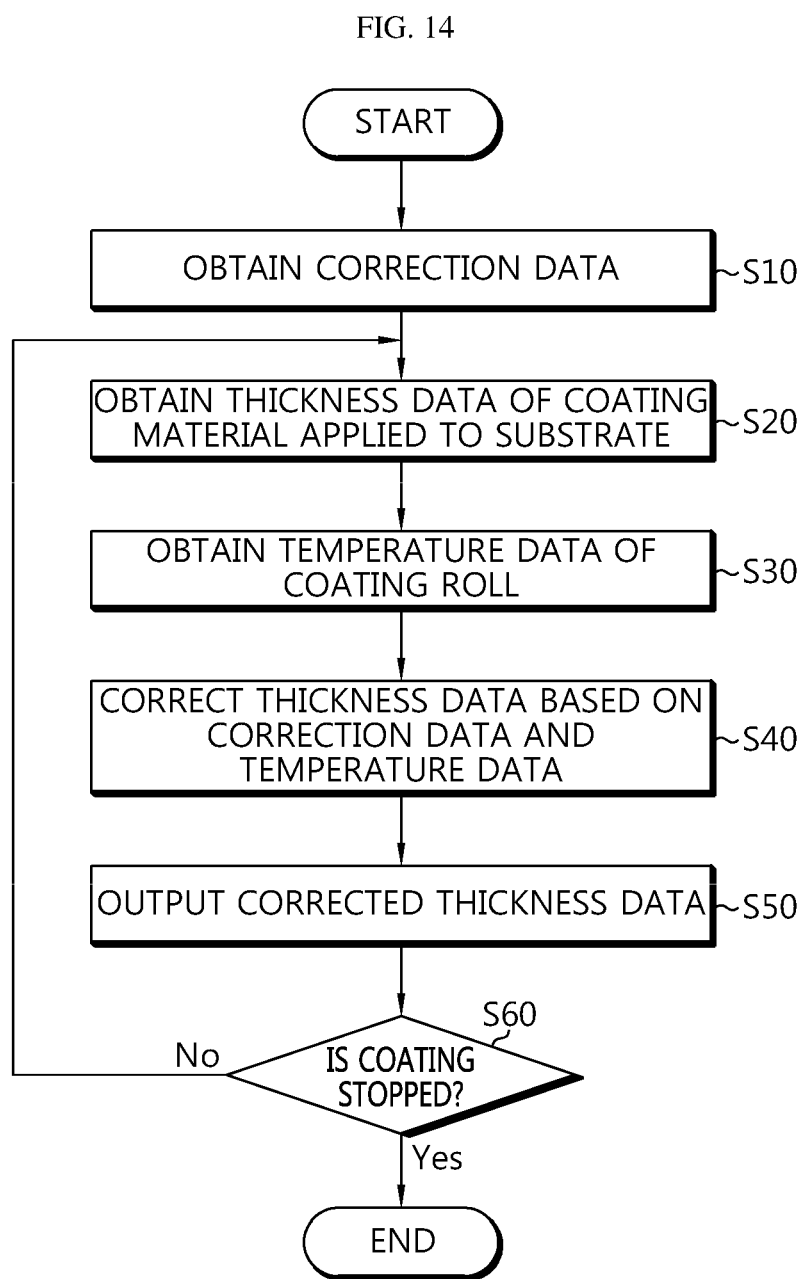
FIG. 14 is a flowchart illustrating a coating thickness measuring method according to an embodiment of the present disclosure.

FIG. 14 is a flowchart illustrating a coating thickness measuring method according to an embodiment of the present disclosure. Hereinafter, detailed operations of the coating thickness measuring apparatus 10 described above will be described time-sequentially with reference to FIG. 14.

As shown in FIG. 14, the coating thickness measuring apparatus 10 configured to measure the thickness of a coating material applied to a substrate obtains correction data used to correct thickness data before a coating process is performed on the substrate (S10).

That is, the data obtaining unit 100, 100A of the coating thickness measuring apparatus 10 may obtain roundness data indicating the roundness value of the corresponding section for each section of the coating roll 22 using a displacement sensor, and transmit the correction data including the roundness data and section identification data of each section to the processor 200.

Then, the processor 200 of the coating thickness measuring apparatus 10 may generate a virtual memory zone having a plurality of storage areas in which the correction data are distributed and stored. For example, the processor 200 may generate a virtual memory zone having a plurality of storage areas, and store the correction data transmitted from the data obtaining unit 100 for each section in the plurality of storage areas of the virtual memory zone.

In addition, the coating thickness measuring apparatus 10 may repeat the above-described correction data obtaining procedure while changing the temperature of the coating roll 22.

Next, while the substrate coated with the coating material is being transported by the coating roll 22, the data obtaining unit 100, 100A of the coating thickness measuring apparatus 10 obtains thickness data representing the thickness of the coating material applied to the contact portion of the substrate in contact with the coating roll 22 (S20).

In this case, the positioning module 120 of the data obtaining unit 100 may adjust the position of the sensing module 110 of the data obtaining unit 100, 100A so that the sensing module 110 senses the thickness of the coating material of the substrate in contact with the coating roll 22, in particular, the end of the corresponding contact portion, among the entire substrate.

In addition, the data obtaining unit 100, 100A may further obtain temperature data representing the temperature of the coating roll 22 by using the temperature sensor 114 while obtaining the thickness data (S30).

Next, the processor 200 of the coating thickness measuring apparatus 10 selects a target storage area from a plurality of storage areas of the virtual memory zone, and corrects the thickness data based on correction data pre-stored in the target storage area to generate corrected thickness data (S40).

For example, the processor 200 may correct the thickness data obtained by the data obtaining unit 100 based on the correction data pre-stored in the target storage area among the plurality of storage areas of the virtual memory zone and the temperature data obtained through the temperature sensor 114.

To this end, the correction data pre-stored in the target storage area may include a data table in which roundness values for each temperature of the section in contact with the thickness measurement target of the substrate among the plurality of sections obtained by dividing the outer circumference of the coating roll 22 according to position are recorded. That is, the processor 200 may check the roundness value of the section corresponding to the obtained temperature data in the data table pre-stored in the target storage area, and correct the obtained thickness data using the checked roundness value.

Then, the coating thickness measuring apparatus 10 may output the corrected thickness data through a display or speaker or transmit the corrected thickness data to an external device such as a management server (S50).

Then, the coating thickness measuring apparatus 10 may repeat the above-described processes until the coating process is stopped (S60).

As described above, according to the embodiments disclosed in this specification, while the substrate coated with the coating material is transferred by the coating rolls, for the portion of the substrate that is in contact with the coating roll among the entire substrate, the data obtaining unit is configured to obtain the thickness data of the coating material applied to the corresponding portion, so it is possible to reduce measurement errors caused by shaking of the substrate and measure the thickness of the coating material applied to the substrate with a high level of accuracy.

In addition, the processor is configured to generate a virtual memory zone having a plurality of storage areas and correct thickness data obtained by the data obtaining unit based on the correction data pre-stored in a target storage area selected from the plurality of storage areas, so it is possible to shorten the coating thickness measurement time while further improving the accuracy of the coating thickness measurement value.

In addition, the data obtaining unit is configured to further obtain temperature data representing the temperature of the coating roll, and the processor is configured to correct the thickness data based on the temperature data and the correction data pre-stored in the target storage area, so the effect of temperature change can be reflected in the coating thickness measurement value, and as a result, the accuracy and reliability of the coating thickness measurement value can be further improved.

In addition, the data obtaining unit includes a sensing module for sensing the thickness of the coating material and a positioning module for adjusting the position of the sensing module, so the sensing position of the sensing module can be optimized, and the position of the sensing module can be appropriately changed according to the size of the substrate to be measured, the relative positions of the rolls transporting the substrate to be measured, and the like.

Furthermore, one of ordinary skill in the art will clearly understand from the following description that embodiments of the present disclosure may also be used to solve various technical problems not mentioned above.

The present disclosure has been described with reference to the specific embodiments. However, it will be understood by one of ordinary skill in the art that various modifications may be made within the scope of the present disclosure. Hence, the disclosed embodiments should be considered in descriptive sense only and not for purposes of limitation. That is, the scope of the present disclosure is defined only by the following claims, and all differences within the scope will be construed as being included in the present disclosure.

What is claimed is:

1. A coating thickness measuring apparatus, comprising:
a data obtaining unit configured to obtain thickness data indicating a thickness of a coating material applied to a contact portion of a substrate in contact with a coating roll while the substrate is transported by the coating roll; and
a processor configured to create a virtual memory zone having a plurality of storage areas in which correction data is distributed and stored, the processor being configured to correct the thickness data based on the correction data that is pre-stored in a target storage area selected from the plurality of storage areas to generate corrected thickness data,
wherein the data obtaining unit is configured to divide an outer circumference of the coating roll into a plurality of sections to further obtain section identification data for identifying a section of the plurality of sections in contact with the contact portion of the substrate, and
wherein the processor is configured to select one of the storage areas corresponding to the section identification data as the target storage area before correcting the thickness data.

2. The coating thickness measuring apparatus according to claim 1, wherein the correction data that is pre-stored in the target storage area includes a roundness value of the section in contact with the contact portion of the substrate.

3. The coating thickness measuring apparatus according to claim 1, wherein the data obtaining unit is configured to further obtain temperature data representing a temperature of the coating roll, and
wherein the processor is configured to correct the thickness data based on the correction data that is pre-stored in the target storage area and the temperature data.

4. The coating thickness measuring apparatus according to claim 1, wherein the data obtaining unit includes:
a sensing module having a thickness sensor; and
a positioning module configured to adjust a position of the sensing module to cause the sensing module to sense the thickness of the coating material applied to the contact portion of the substrate using the thickness sensor to generate the thickness data.

5. The coating thickness measuring apparatus according to claim 4, wherein the sensing module further includes a temperature sensor for sensing a temperature of the coating roll, and wherein the processor is configured to correct the thickness data based on the correction data that is pre-stored in the target storage area and temperature data obtained by the temperature sensor.

6. The coating thickness measuring apparatus according to claim 4, wherein the positioning module includes:
a first moving unit configured to move the sensing module along a first axis; and
a second moving unit configured to move the sensing module along a second axis intersecting the first axis.

7. The coating thickness measuring apparatus according to claim 6, wherein the positioning module further includes a third moving unit configured to move the sensing module along a third axis intersecting the first axis and the second axis.

8. The coating thickness measuring apparatus according to claim 6, wherein the positioning module further includes a rotating unit configured to rotate the sensing module within a predetermined rotation angle range around a rotation axis.

9. The coating thickness measuring apparatus according to claim 1, wherein the data obtaining unit is one of a plurality of data obtaining units spaced apart from each other in a width direction of the substrate, the width direction being perpendicular to a longitudinal transfer direction of the substrate.

10. A coating thickness measuring apparatus, comprising:
a data obtaining unit configured to obtain thickness data indicating a thickness of a coating material applied to a contact portion of a substrate in contact with a coating roll while the substrate is transported by the coating roll; and
a processor configured to create a virtual memory zone having a plurality of storage areas in which correction data is distributed and stored, the processor being configured to correct the thickness data based on the correction data that is pre-stored in a target storage area selected from the plurality of storage areas to generate corrected thickness data,
wherein the data obtaining unit is configured to further obtain temperature data representing a temperature of the coating roll,
wherein the processor is configured to correct the thickness data based on the correction data that is pre-stored in the target storage area and the temperature data, and
wherein the correction data that is pre-stored includes a data table in which roundness values for each temperature of a section of the plurality of sections in contact with the contact portion of the substrate are recorded according to a position of the section along the outer circumference of the coating roll.

11. A coating thickness measuring apparatus 3, comprising:
a data obtaining unit configured to obtain thickness data indicating a thickness of a coating material applied to a contact portion of a substrate in contact with a coating roll while the substrate is transported by the coating roll; and
a processor configured to create a virtual memory zone having a plurality of storage areas in which correction data is distributed and stored, the processor being configured to correct the thickness data based on the correction data that is pre-stored in a target storage area selected from the plurality of storage areas to generate corrected thickness data,
wherein the data obtaining unit is configured to divide an outer circumference of the coating roll into a plurality of sections and obtain roundness data representing a roundness of each of the plurality of sections, before obtaining the thickness data, and wherein the processor is configured to divide and store the roundness data of each of the plurality of sections in the plurality of storage areas.

12. A coating thickness measuring method, which is performed by a device for measuring a thickness of a coating material applied to a substrate, the method comprising:

creating a virtual memory zone having a plurality of storage areas in which correction data is distributed and stored;

obtaining thickness data indicating a thickness of a coating material applied to a contact portion of the substrate in contact with a coating roll while the substrate is transported by the coating roll;

correcting the thickness data based on the correction data that is pre-stored in a target storage area of the plurality of storage areas to generate corrected thickness data; and before generating the corrected thickness data, obtaining temperature data representing a temperature of the coating roll, wherein the generating of the corrected thickness data includes correcting the thickness data based on the correction data that is pre-stored in the target storage area and the temperature data, and wherein the correction data that is pre-stored includes a data table in which roundness values for each temperature of a section of a plurality of sections of an outer circumference of the coating roll in contact with the contact portion of the substrate are recorded according to a position of the section along the outer circumference of the coating roll.

* * * * *